(12) United States Patent
Tsukada

(10) Patent No.: US 9,273,948 B2
(45) Date of Patent: Mar. 1, 2016

(54) OPTICAL FIBER SENSOR

(71) Applicant: Hakusan Corporation, Tokyo (JP)

(72) Inventor: Kazumasa Tsukada, Tokyo (JP)

(73) Assignee: HAKUSAN CORPORATION, Tokyo (JP)

( * ) Notice: Subject to any disclaimer, the term of this patent is extended or adjusted under 35 U.S.C. 154(b) by 53 days.

(21) Appl. No.: 14/357,323

(22) PCT Filed: Nov. 19, 2012

(86) PCT No.: PCT/JP2012/079907
§ 371 (c)(1),
(2) Date: May 9, 2014

(87) PCT Pub. No.: WO2013/077280
PCT Pub. Date: May 30, 2013

(65) Prior Publication Data
US 2014/0300900 A1    Oct. 9, 2014

(30) Foreign Application Priority Data

Nov. 25, 2011    (JP) .................................. 2011-271701

(51) Int. Cl.
G01B 9/02         (2006.01)
G01H 9/00         (2006.01)
G01L 1/24         (2006.01)
G01D 5/353        (2006.01)

(52) U.S. Cl.
CPC ............ *G01B 9/02023* (2013.01); *G01H 9/004* (2013.01); *G01L 1/242* (2013.01); *G01D 5/35335* (2013.01)

(58) Field of Classification Search
CPC ........... G01B 9/02023; G01D 5/35335; G01H 9/004; G01L 1/24; G01L 1/242
See application file for complete search history.

(56) References Cited

U.S. PATENT DOCUMENTS

| | | | |
|---|---|---|---|
| 2007/0024857 A1* | 2/2007 | Menezo | 356/478 |
| 2007/0103692 A1* | 5/2007 | Hall et al. | 356/478 |
| 2010/0313658 A1* | 12/2010 | Andersen et al. | 73/514.26 |
| 2012/0297883 A1* | 11/2012 | Kupershmidt | 73/655 |
| 2013/0292555 A1* | 11/2013 | Akkaya et al. | 250/227.14 |

FOREIGN PATENT DOCUMENTS

| | | |
|---|---|---|
| JP | 2008-082921 | 4/2008 |
| JP | 2010-117333 | 5/2010 |
| JP | 2011-128127 | 6/2011 |

OTHER PUBLICATIONS

International Search Report issued Dec. 18, 2012 in International (PCT) Application No. PCT/JP2012/079907.

* cited by examiner

*Primary Examiner* — Michael A Lyons
(74) *Attorney, Agent, or Firm* — Wenderoth, Lind & Ponack, L.L.P.

(57) ABSTRACT

An input of an optical interferometer is a periodical optical pulse. A phase of a first half and a latter half of a reference pulse is a 90 degree (independently orthogonal) phase difference. Two interferometric outputs i1 and i2, where the phase difference is 90 degrees from each other, are obtained by interference of the reference pulse and the signal pulse. θ is calculated by referring the amplitude of reference pulse and the signal pulse to remove the light intensity fluctuations. Two values of cos θ1 and cos θ2 are calculated and positions are determined on the cosine curve by obtaining θ1 and θ2 values. Δθ1 and Δθ2, which are the phase increment or decrement of both θ1 and θ2 in a T period, are summed and becomes the sensor output signal that removes the measurement range limitation of ±90 degrees (a half wavelength of light) of the light phase.

2 Claims, 2 Drawing Sheets

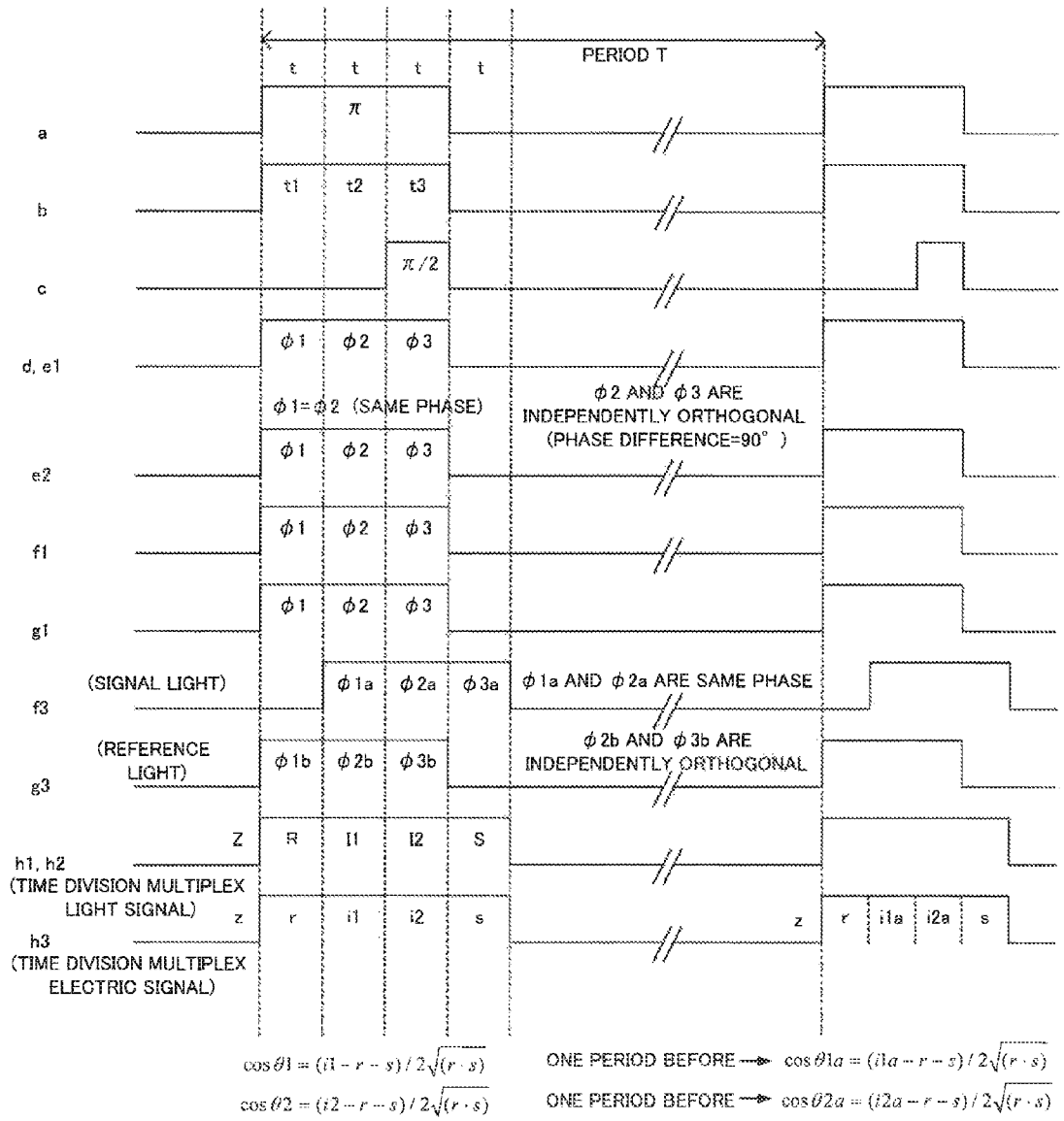

OPTICAL FIBER SENSOR

TECHNICAL FIELD

The present invention relates to an optical fiber sensor utilizing a distinctive character that a phase of an optical signal passing through an optical path is changed by an external force.

BACKGROUND ART

In a conventional homodyne interferometer system, if a phase difference between a reference light (R) and a signal light (S) is represented as $\theta$, an interferometer output (I) is represented by the following formula:

$$I = R + S + 2\sqrt{(R \cdot S)} \cos \theta$$

(I, R and S are the laser power values.)
$\theta = \arccos((I - R - S)/2\sqrt{(R \cdot S)})$ In the conventional homodyne interferometer system, a sensor output signal is affected by fluctuation of a laser signal generator output level in accordance with temperature drift, which results in variation in an optical fiber transmission path and residual errors in the output value of the sensor output signal because the output value is calculated according to the condition that the reference light and the signal light intensities are constant.

Although the conventional homodyne interferometer system is able to detect the phase difference of a half of light wavelength between the reference light and the signal light, it is almost impossible to keep the phase difference between the reference light and the signal light within this narrow range because the components of the conventional homodyne interferometer system do not have excellent dimension accuracy in order to keep the phase difference into the narrow range. Moreover, it is impossible to eliminate, in the conventional homodyne interferometer system, the optical path fluctuation by the influence of temperature variation in the surrounding environmental. Further, it is noted that it is noted possible to extend the this limited measurement range in the conventional interferometer system.

Based on the above-noted deficiencies in the conventional homodyne interferometer system, an optical fiber sensor that shows good insusceptibility to a strong electromagnetic field and an extremely high or low temperature environment is desired, in order to provide an optical fiber sensor for low transmission loss over long distances.

SUMMARY OF THE INVENTION

The present invention has been developed for solving the above-noted deficiencies in the conventional homodyne interferometer system, and the present invention realizes the optical fiber sensor which is free from the residual errors caused by the light intensity fluctuations and is not limited the measurement range limitation of the conventional homodyne interferometer system. The above object of the present invention is achieved by providing a wavelength stabilized laser source, by which a laser pulse having a period T and a pulse width $3t$ (the pulse width including parts t1, t2 and t3) is generated, where the laser pulse is phase modulated such that the phrase of t1 is equal to the phase of t2 and there is a 90 degree (independently orthogonal) phase difference between the phase of t2 and the phase of t3.

Hereinafter the phase of t1 is referred to as $\phi 1$, the phase of t2 is referred to as $\phi 2$, and the phase of t3 is referred to as $\phi 3$.

Further, the purpose of the present invention is achieved by constructing an original optical interferometer. In the present invention, the above mentioned laser pulse is first divided into two (2) laser pulses by an optical coupler, one of which is applied to a t/2 optical delay line and then is supplied to a motion sensor. The motion sensor has a weight on which laser pulse reflecting mirrors are stationed at both sides, and the weight moves according to the externally applied force, thus the sensor changes the optical path length according to the externally applied force. The reflected laser pulse is again applied to the t/2 optical delay line. Hereinafter, the phases of the delayed reflected laser pulse applied to the t/2 delay line are respectively referred to as $\phi 1a$, $\phi 2a$, and $\phi 3a$.

The other of the two laser pulses is applied to the other side of mirror on the motion sensor without time delay. Hereinafter, the phases of the non-delayed reflected laser pulse are respectively referred to as $\phi 1b$, $\phi 2b$, and $\phi 3b$.

The two reflected laser pulses are combined by the optical coupler and form a Michelson Interferometer. At the output of the Michelson Interferometer, the following five (5) different optical pulse signals are obtained: no optical signal region (Z); $\phi 1b$ region (R); interferometric region between $\phi 2b$ and $\phi 1a$ (I1); interferometric region between $\phi 3b$ and $\phi 2a$ (I2); and $\phi 3a$ region (S). These five signals Z, R, I1, I2 and S form a Time Division Multiplex (TDM) optical signal.

The TDM optical signal is transformed into an electric signal by an Optic to Electricity Converter (O/E), and the components z, r, i1, i2 and s are respectively obtained as the electrical derivation of the optical signals of Z, R, I1, I2 and S. The value z is utilized to obtain the precise value of i1, i2, r and s by cancelling out the residual voltage appears at the output of O/E converter in the period of no optical signal (no optical pulse).

The Michelson Interferometer output is able to be calculated by the following formulas:

$$i1 = r + s + 2\sqrt{(r \cdot s)} \cos \theta 1$$

$$i2 = r + s + 2\sqrt{(r \cdot s)} \cos \theta 2$$

where $\theta$ is the angle between the two laser pulses reflected by the mirror on the motion sensor.

The values $\cos \theta 1$ and $\cos \theta 2$ are led by transforming the above formulas as follows:

$\cos \theta 1 = (i1 - r - s)/2\sqrt{(r \cdot s)}$ $\theta 1 = \arccos((i1 - r - s)/2\sqrt{(r \cdot s)})$ $\cos \theta 2 = (i2 - r - s)/2\sqrt{(r \cdot s)}$ $\theta 2 = \arccos((i2 \cdot r \cdot s)/2\sqrt{(r \cdot s)})$ As the calculation inaccuracy of arccosine function is increased in proportion to cosine value, smaller cosine value is selected between $\cos \theta 1$ and $\theta 2$ and angle $\theta$ of the selected cosine value is treated as measured datum $\theta$. Then $\Delta \theta$, which is the increment or decrement of $\theta$ in T period, is derived from present $\theta$ and the value period T before and arithmetic summation of $\Delta \theta$ is sent out as the sensor output signal.

Effects of the Invention

The laser signal level fluctuates with various factors, e.g., environmental temperature drift, atmospheric pressure change and so forth, and their electrical representation of r i1, i2, and s also fluctuate. However, the influence of such drifts are removed in the process of calculating $\cos \theta 1$ and $\cos \theta 2$ because inaccuracy in $\cos \theta 1$ and $\cos \theta 2$ is removed as a result of the calculation formula being developed to remove the inaccuracy by the calibration process in the formula by using instant measured values of r, s and i. Accordingly, the final measured datum includes very small measurement error caused from laser level drift, the optical fiber loss fluctuation or optical coupler loss change expected at an aversely severe circumstance. This contributes to reduce the system manufacturing cost as it allows the use of inexpensive components.

According to the present invention, $\cos\theta_1$ and $\cos\theta_2$ are obtained, which are orthogonal in phase each other, with the interferometric phenomenon between signal light and reference light. By this condition that $\cos\theta_1$ and $\cos\theta_2$ are 90 degree shifted in each other, one of two measured values always lies within $\pm 1/\sqrt{2}$ where good calculation accuracy from cosine to arccosine transformation is guaranteed. If the transformed value from the smaller $\cos\theta$ is selected, the value is always smaller than $\pm 1/\sqrt{2}$ and satisfactory measurement accuracy is assured. Moreover, this does not require precise control of phase between $\cos\theta_1$ and $\cos\theta_2$, and as a results, reduces the precision dimension required in component manufacturing.

The present invention provides a measurement range of multiple wavelengths because the direction of phase movement in the T period, i.e., $\Delta\theta$ is increased or decreased, is able to be understood by the values and phases of $\cos\theta_1$ and $\cos\theta_2$, based on the condition that $\cos\theta_1$ and $\cos\theta_2$ are orthogonal.

Furthermore, the measurement dynamic range is able to be extended largely by shortening the measurement period T, i.e., higher sampling frequency larger dynamic range, because the sensor output is the summation of $\Delta\theta$ and the number of $\Delta\theta$ per second is the proportion of the sampling frequency.

BRIEF DESCRIPTION OF THE DRAWINGS

In the accompanying drawings:
FIG. 2 is a time chart showing an example of optical fiber sensor operation according to the present invention.

DETAILED DESCRIPTION OF THE INVENTION

Figure 1:
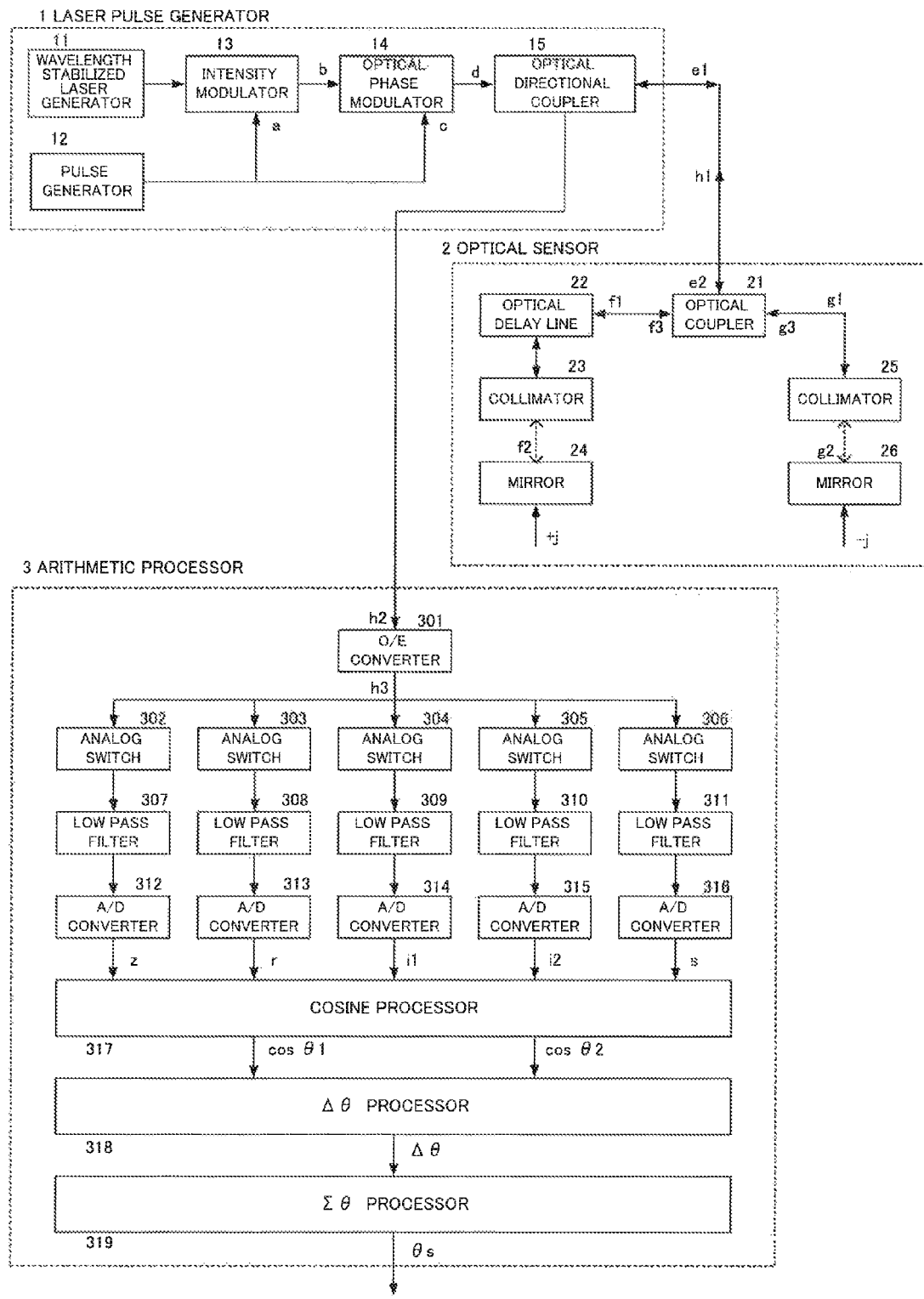
FIG. 1 is a block diagram showing an example of constitution of the optical fiber sensor according to the present invention.

FIG. 1 is the example of the optical fiber sensor of the present invention, where a laser pulse generator 1, an optical sensor 2, and an arithmetic processor 3 are illustrated.

First, a laser pulse of $3t$ width in every T period is generated in the laser pulse generator 1, with which the light phase of front $2t$ portion is set to 0 degree (°) and last It portion 90 degree (°) in each other. The laser pulse is divided into two (2) by the optical coupler and one of which is applied to an optical sensor 2 through a t/2 optical delay line. The other half of laser pulse is applied to the other input of the optical sensor 2. Both laser pulse phases are shifted in proportion to the external force applied to the optical sensor 2.

The reflected laser pulses, one through t/2 optical delay line and the other directly, are combined by the optical coupler and the overall optical circuit forms a Michelson interferometer. The interferometer output laser pulse, i.e., the output optical pulse from the optical coupler is applied to the arithmetic processor 3 through the optical directional coupler 15 in the laser pulse generator 1. The arithmetic processor 3 detects the optical pulse amplitude and calculates $\cos\theta_1$ and $\cos\theta_2$, then transforms $\cos\theta_1$ and $\cos\theta_2$ into $\theta_1$ and $\theta_2$, and further obtains $\theta$s as the arithmetic processor 3 final output.

The output optical pulse of the optical sensor 2 is the Time Division Multiplex (TDM) signal. The TDM signal shows a series of amplitude data, i.e., Z, R, I1, I2 and S, which represent no optical signal region (Z), the $\phi 1b$ region (R), the interferometric region between $\phi 2b$ and $\phi 1a$ (I1), the interferometric region between $\phi 3b$ and $\phi 2a$ (I2), and the $\phi 3a$ region (S). In the arithmetic processor 3, z, r, i1, i2 and s are obtained as the electrical derivation of the optical signals of Z, R, I1, I2 and S, and $\cos\theta_1$ and $\cos\theta_2$ are calculated.

Next, the operation theory of the optical fiber sensor shown in FIG. 1 is explained by referring a time chart of the optical fiber sensor FIG. 2. The structure of the optical fiber sensor is first described in detail. The sensor is comprised of a laser pulse generator 1, an optical sensor 2 and an arithmetic processor 3.

In the laser pulse generator 1, a laser signal generated by a wavelength stabilized laser generator 11 is amplitude modulated by an intensity modulator 13 with a driving pulse signal "a" from a pulse generator 12, whose driving pulse makes the intensity modulator "on" and "off", and makes a laser pulse "b" of $3t$ width in every T duration. The laser pulse "b" is further phase modulated by an optical phase modulator 14, with which the first part of laser pulse t1 and middle part of it t2 phases are set to zero (0) degree and the last part of it t3 is set to 90 degree ($\pi/2$) by the driving signal "c", so that both t1, t2 and t3 is 90 degree different in relative phase. (Both t1, t2 and t3 relative phase is orthogonal in each other.)

The output laser pulse "d" from the optical phase modulator 14 is sent to the optical sensor 2 through an optical directional coupler 15 as "e1". Consequently, the laser pulse generator 1 sends out the laser pulse of $3t$ length (the first part t1, the second part t2 and the third part t3), whose light phase is $\phi 1$ at t1, $\phi 2$ at t2 and $\phi 3$ at t3. The phase relation is $\theta_1=\phi_2$, $\phi_2$ is orthogonal to $\phi_3$.

The laser pulse of $3t$ width from laser pulse generator 1 is applied to an optical coupler 21 in the optical sensor 2 as "e2". One of the divided laser signals "f1" generated by the optical coupler 21 is led to a t/2 optical delay line 22 and then to a collimator 23, which transmits the laser signal to a mirror 24 as "f2". The collimator is used as a beam parallelizing apparatus to send the laser signal to the mirror and receive the laser signal reflected by the mirror in a good condition.

The mirror 24 makes the phase change according to the moving distance of mirror by an externally applied force "+j" and the laser pulse signal is returned back to the optical coupler 21 as "f3", whose $3t$ component phases are respectively referred to as $\phi 1a$, $\phi 2a$ and $\phi 3a$. The other one of the divided laser signals "f1" generated by the optical coupler 21 is led to an another collimator 25 and then transmitted into air so that the transmitted laser signal "g2" is reflected by an another mirror 26. The reflected laser signal from the mirror 26 is supplied to the optical coupler 21 through the collimator 25 as "g3", whose $3t$ component phases are respectively referred to as $\phi 1b$, $\phi 2b$ and $\phi 3b$. The mirror 26 receives the external force "j", opposite from the mirror 25, as the mirrors 24 and 26 are installed on one (1) moving weight back to back.

The reflected laser pulse signals "f3" and "g3" are combined in the optical coupler 21 and to form a Time Division Multiplex (TDM) laser signal "h1". The laser signal "f3" from the mirror 24 has the delay time of t compared with the reflected laser signal "g3", because "f3" passing through the t/2 delay line twice. The TDM signal "h1" has five (5) components of amplitude data, i.e., Z, R, I1, I2 and S, which represent a no optical signal region (Z), a $\phi 1b$ region (R), an interferometric region between φ2b and φ1a (I1), an interferometric region between φ3b and φ2a (I2), and a φ3a region (S).

The TDM signal "h1" is applied back to the optical directional coupler 15. The optical directional coupler 15 makes the routing of the TDM signal "h1" to an O/E converter 301 in the arithmetic processor 3. The O/E converter 301 transforms the laser pulse signal into an electric signal and the resulted TDM electric signal as "h3", i.e., z, r, i1, i2 and s are obtained as the electrical derivation of the optical signals of Z, R, I1, I2 and S. The electric signals z, r, i1, i2 and s are supplied to A/D converters 312, 313, 314, 315 and 316 through analog switches 302, 303, 304, 305 and 306 and further through low pass filters 307, 308, 309, 310, 311 and 312. The analog switches distribute the electric signals to the designated low pass filters and the low pass filters filter the high frequency components contained in the electric signals and provide necessary frequency band limitation.

The A/D converters 312, 313, 314, 315 and 316 convert z, r, i1, i2 and s into digital values and the resulting digital values are applied to a cosine processor 317, which makes the calculation necessary to obtain cosine values. In the cosine processor 317, first r, i1, i2 and s voltages are calibrated by the value of z in order to remove the uncertainty of measured voltage. Then, the processor 317 calculates the values cos θ1 and cos θ2 from r, i1, i2 and s. The calculated values of cos θ1 and cos θ2 from the processor unit 317 are further transmitted to a Δθ processor 318. In the Δθ processor 318 first θ1 and θ2 are calculated from cos θ1 and cos θ2 and then Δθ1 and Δθ2, which are the finite difference of θ1 and θ2 in a period of time T. The values Δθ1 and Δθ2 are transferred to the next processor, a Σθ processor 319, an appropriate one is selected from Δθ1 and Δθ2 and the selected one's value is added to θs in each T period. The value θs is the final optical fiber sensor output.

In the present invention, the calculations of cos θ1 and cos θ2 are done by the Formula 1 and Formula 2 as follows:

$$\cos\theta1 = (i1-r-s)/2\sqrt{(r\cdot s)} \quad \text{Formula 1}$$

$$\cos\theta2 = (i2-r-s)/2\sqrt{(r\cdot s)} \quad \text{Formula 2}$$

In the above formulas, r represents φ1b of g3, s φ3a of f3, i1 interferometric output between φ2b of g3 and φ1a, i2 interferometric output between φ3b of g3 and φ2a. Moreover, as the laser signals φ2b and φ3b are orthogonal in each other, the angle difference between θ1 and θ2 is 90 degree (°). The Δθ processor 318 makes calculations and procedures listed in (1) to (7) below.
(1) Identify the smaller one in the absolute value from cos θ1 and cos θ2.
(2) Distinguish the polarities of cos θ1 and cos θ2.
(3) The values of cos θ1 and cos θ2, and the conditions of (1) and (2), decide the θ point on the cosine curve.
(4) Calculate θ1 and θ2 from the result of (3)
(5) Name obtained θ1 and θ2 as θ1a and θ2a
(6) Calculate the difference Δθ

$$\Delta\theta1 = \theta1 - \theta1a$$

$$\Delta\theta2 = \theta2 - \theta2a$$

where Δθ is the difference between θ1 of the previous datum and the new datum (θ1a or θ2a).
(7) Select the smaller absolute value of Δθ from Δθ1 and Δθ2. Send out selected Δθ to the Σθ processor 319.

The selected Δθ is added to the θs in the Σθ processor 319 and the θs is the optical fiber sensor output signal. There is an important assumption that the instant phase change of sensed laser signals f3 and g3 shall not exceed ±π/2 in a sample period of T.

Operation and Effects

According to the present invention, cos θ1 and cos θ2 can be correctly positioned on a cosine curve if Δθ, which is the increment or decrement of θ in T period, is within 90 degrees. Further, as a precise phase change can be measured, if the increment or decrement of θ in T period is kept within 90 degrees, the present invention can extend the dynamic range by increasing the integration number and overcomes the limit of ±90 degree, which the conventional system cannot.

The present invention assumes the case that the example of the phase difference of reference light is independently orthogonal. The same effect can be obtained if the phase difference of signal light is independently orthogonal. Also, the discussion until now is made with the assumption that the phase difference of the reference light is ±90 degree, but the same effect can also be obtained by the phase difference is fixed to approximately ±90 degree.

Moreover, the discussion until now is made with the assumption that the delay time of the optical fiber is t/2, but the same effect can be achieved by a delay time of around t/2. In the example of optical sensor 2, two mirrors are used to increase the sensor sensitivity. However, the system can be modified so as to use one (1) mirror.

The aforementioned embodiment, the construction of the interferometer of the sensor section is explained with the Michelson interferometer system, but the similar operation is possible using the Mach-Zehnder interferometer system.

INDUSTRIAL APPLICABILITY

The present invention is applied for the sensor system which is installed at the remote location, the strong electromagnetic field, extremely high and low temperature environment and the area which cannot have power supply.

EXPLANATION OF LETTERS OR NUMERALS 1 laser pulse generator
2 optical sensor
3 arithmetic processor
11 wavelength stabilized laser generator
12 pulse generator
13 intensity modulator
14 optical phase modulator
15 optical directional coupler
21 optical coupler
22 optical delay line
23,25 collimator
24,26 mirror
301 O/E converter
302-306 analog switch
307-311 low pass filter
312-316 A/D converter
317 cosine processor
318 Δθ processor
319 Σθ processor

The invention claimed is:
1. An optical fiber sensor for outputting an output signal $\theta_s$, the optical fiber sensor comprising:
a signal light generator for generating a laser pulse, the laser pulse having (i) a period T and (ii) a pulse length including a first part t1, a second part t2, and a third part t3, a phase of the first part t1 being equal to the phase of the second part t2, and the phase of the second part t2 being orthogonal to the phase of the third part t3; and a sensor including
- an optical coupler for dividing the laser pulse into a first laser pulse and a second laser pulse, each of the first laser pulse and the second laser pulse having the pulse length including the first part t1, the second part t2, and the third part t3,
- an optical delay line for delaying the first laser pulse by a predetermined amount;
- a first mirror for (i) changing the phase of the delayed first laser pulse according to a first externally applied force applied to the first mirror and (ii) reflecting the first laser pulse, and
- a second mirror for (i) changing the phase of the second laser pulse according to a second externally applied force applied to the second mirror, the second externally applied force being opposite to the first externally applied force applied to the first mirror and (ii) reflecting the second laser pulse, wherein the optical delay line delays the reflected first laser pulse by the predetermined amount, wherein the optical coupler combines the delayed reflected first laser pulse and the reflected second laser pulse to obtain a Time Division Multiplex (TDM) optical signal including (i) a first optical signal R corresponding to the first part t1 of the reflected second laser pulse, (ii) a second optical signal I1 corresponding to an interference region between the first part t1 of the delayed reflected first laser pulse and the second part t2 of the reflected second laser pulse, (iii) a third optical signal I2 corresponding to an interference region between the second part t2 of the delayed reflected first laser pulse and the third part t3 of the reflected second laser pulse, and (iv) a fourth optical signal S corresponding to the third part t3 of the delayed reflected first laser pulse, and wherein the optical fiber sensor further comprises an arithmetic processor for performing the following:
- individually deriving (i) a first electric signal r from the first optical signal R, (ii) a second electrical signal i1 from the first optical signal I1, (iii) a third electrical signal i2 from the third optical signal I2, and (iv) a fourth electrical signal s from the fourth optical signal S;
- obtaining the cosine of a first angle $\theta_1$ between the delayed reflected first laser pulse and the reflected second laser pulse using a formula $\cos\theta_1=(i1-r-s)/2\sqrt{(r\cdot s)}$;
- obtaining the cosine of a second angle $\theta_2$ between the delayed reflected first laser pulse and the reflected second laser pulse using a formula $\cos\theta_2=(i2-r-s)/2\sqrt{(r\cdot s)}$;
- selecting the smaller from the cosine of the first angle $\theta_1$ and the cosine of the second angle $\theta_2$, and obtaining, as a current measured datum, the angle of the selected cosine;
- obtaining a difference $\Delta\theta$ between the current measured datum and a previously measured datum, the difference representing an increment or decrement of the current measured datum in the period T; and
- adding the difference $\Delta\theta$ to the current measured datum to obtain the output signal $\theta_s$, and outputting the output signal $\theta_s$.

2. A method for outputting an output signal $\theta_s$ for an optical fiber sensor, the method comprising:

generating a laser pulse, the laser pulse having (i) a period T and (ii) a pulse length including a first part t1, a second part t2, and a third part t3, a phase of the first part t1 being equal to the phase of the second part t2, and the phase of the second part t2 being orthogonal to the phase of the third part t3;

dividing the laser pulse into a first laser pulse and a second laser pulse, each of the first laser pulse and the second laser pulse having the pulse length including the first part t1, the second part t2, and the third part t3;

delaying the first laser pulse by a predetermined amount;

using a first mirror, (i) changing the phase of the delayed first laser pulse according to a first externally applied force applied to the first mirror and (ii) reflecting the first laser pulse;

using a second mirror, (i) changing the phase of the second laser pulse according to a second externally applied force applied to the second mirror, the second externally applied force being opposite to the first externally applied force applied to the first mirror and (ii) reflecting the second laser pulse;

delaying the reflected first laser pulse by the predetermined amount;

combining the delayed reflected first laser pulse and the reflected second laser pulse to obtain a Time Division Multiplex (TDM) optical signal including (i) a first optical signal R corresponding to the first part t1 of the reflected second laser pulse, (ii) a second optical signal I1 corresponding to the first part t1 of the delayed reflected first laser pulse and the second part t2 of the reflected second laser pulse, (iii) a third optical signal I2 corresponding to the second part t2 of the delayed reflected first laser pulse and the third part t3 of the reflected second laser pulse, and (iv) a fourth optical signal S corresponding to the third part t3 of the delayed reflected first laser pulse;

individually deriving (i) a first electric signal r from the first optical signal R, (ii) a second electrical signal i1 from the first optical signal I1, (iii) a third electrical signal i2 from the third optical signal I2, and (iv) a fourth electrical signal s from the fourth optical signal S;

obtaining the cosine of a first angle $\theta_1$ between the delayed reflected first laser pulse and the reflected second laser pulse using a formula $\cos\theta_1=(i1-r-s)/2\sqrt{(r\cdot s)}$;

obtaining the cosine of a second angle $\theta_2$ between the delayed reflected first laser pulse and the reflected second laser pulse using a formula $\cos\theta_2=(i2-r-s)/2\sqrt{(r\cdot s)}$;

selecting the smaller from the cosine of the first angle $\theta_1$ and the cosine of the second angle $\theta_2$, and obtaining, as a current measured datum, the angle of the selected cosine;

obtaining a difference $\Delta\theta$ between the current measured datum and a previously measured datum, the difference representing an increment or decrement of the current measured datum in the period T; and adding the difference $\Delta\theta$ to the current measured datum to obtain the output signal $\theta_s$, and outputting the output signal $\theta_s$.

* * * * *